US012336530B2

(12) United States Patent
Hill et al.

(10) Patent No.: US 12,336,530 B2
(45) Date of Patent: Jun. 24, 2025

(54) CHEMIGATION SYSTEM

(71) Applicant: Bluberry, LLC, Cottonwood Heights, UT (US)

(72) Inventors: Jarvis Hill, Pflugerville, TX (US); Rex Knickerbocker, Henderson, NV (US); Dustin Johnson, Salt Lake City, UT (US)

(73) Assignee: Bluberry, LLC, Cottonwood Heights, UT (US)

( * ) Notice: Subject to any disclaimer, the term of this patent is extended or adjusted under 35 U.S.C. 154(b) by 798 days.

(21) Appl. No.: 17/668,066

(22) Filed: Feb. 9, 2022

(65) Prior Publication Data

US 2023/0247979 A1     Aug. 10, 2023

(51) Int. Cl.
*A01M 7/00*     (2006.01)
*A01C 23/00*     (2006.01)
*A01C 23/04*     (2006.01)
*H02J 3/00*     (2006.01)

(52) U.S. Cl.
CPC ......... *A01M 7/0089* (2013.01); *A01C 23/007* (2013.01); *A01C 23/042* (2013.01); *A01M 7/0032* (2013.01); *H02J 3/00* (2013.01)

(58) Field of Classification Search
CPC ................................................... A01G 25/16
See application file for complete search history.

(56) References Cited

U.S. PATENT DOCUMENTS

| | | | | |
|---|---|---|---|---|
| 5,931,882 A | * | 8/1999 | Fick | A01C 23/007 172/4 |
| 7,406,363 B2 | * | 7/2008 | Doering | A01G 25/162 700/282 |
| 2009/0076659 A1 | * | 3/2009 | Ensworth | A01G 25/16 700/284 |
| 2018/0295796 A1 | * | 10/2018 | Woytowitz | G05F 1/12 |
| 2019/0246558 A1 | * | 8/2019 | Miller | A01G 25/165 |

\* cited by examiner

*Primary Examiner* — Joseph H Feild
*Assistant Examiner* — Pameshanand Mahase
(74) *Attorney, Agent, or Firm* — Kirton McConkie; Brian Tucker

(57) ABSTRACT

A chemigation system can be easily integrated into existing irrigation systems. The chemigation system can include a primary controller that can be installed near the irrigation controller of the irrigation system. The chemigation system can also include a secondary controller that can be installed near a valve assembly of the irrigation system. The primary controller and secondary controller can leverage the existing irrigation wire of the irrigation system to intercommunicate for purposes of controlling the injection of chemicals into the irrigation water and controlling an actuator for a valve of the valve assembly.

20 Claims, 12 Drawing Sheets

CHEMIGATION SYSTEM

CROSS-REFERENCE TO RELATED APPLICATIONS

N/A

BACKGROUND

Chemigation is the injection of any chemical, such as fertilizers and pesticides, into irrigation water for application to land using an irrigation system. Chemigation is often performed in agricultural environments using complex chemigation systems. In agricultural environments, the irrigation system is typically above ground making it relatively easy to integrate a chemigation system.

Some chemigation systems have been developed for use in residential and commercial irrigation systems. These chemigation systems are relatively easy to install at the same time as the irrigation system. However, if the irrigation system is already installed, the installation of the chemigation system is invasive and expensive, if even possible. For example, to install chemigation systems into an existing residential or commercial irrigation system, it would typically be necessary to excavate along the irrigation lines and around the valve boxes to install and interconnect the various components of the chemigation system and the irrigation system. Even if they are willing to incur the cost, many homeowners or commercial landowners are unwilling to damage existing landscaping, concrete, or other structures to install a chemigation system.

FIG. 1 provides an example of an irrigation system 10 that is commonly used for irrigating residential or commercial landscapes. Irrigation system 10 includes an irrigation controller 20 (e.g., a sprinkler clock) and an irrigation valve assembly 30 (e.g., in a valve box). Irrigation valve assembly 30 can include one or more valves 31 that control the flow of water from a main line 50 to station lines 51. Actuators 32 (e.g., solenoids) are used to open and close valves 31.

Irrigation controller 20 typically runs on 24 V AC. For example, irrigation controller 20 can include power terminals 23 by which an adapter 24 supplies 24 V AC via a cord 24a. Irrigation controller 20 can also include a common terminal 21 and one or more station terminals 22. Common terminal 21 is typically connected to the negative terminal of power terminals 23 and each station terminal 22 is selectively connected to the positive terminal of power terminals 23. For example, to open valve 31 for a particular station line 51, irrigation controller 20 can couple the corresponding station terminal 22 to the positive terminal of power terminals 23 (or otherwise complete the circuit) to thereby drive the corresponding actuator 32.

Irrigation wire 40 is used to connect each actuator 32 to irrigation controller 20. In particular, a common wire 41 can be connected between common terminal 21 and each actuator 32, while a separate station wire 42 can be connected between each station terminal 22 and a particular actuator 32. Irrigation wire 40 is typically run underground and installed at the same time as the other components of irrigation system 10. In FIG. 1, irrigation wire 40 includes four total wires (or conductors). However, irrigation wire oftentimes includes five, seven, or ten total wires. It is typical to use irrigation wire having a number of wires matching the number of valves. In other words, there oftentimes is not an unused wire.

FIG. 2 is a block diagram showing how the components of irrigation system 10 are interconnected. As shown, common wire 41 is connected between common terminal 21 and a terminal of each actuator 32 (which is designated the negative terminal). A separate station wire 42 is connected between each station terminal 22 and the other terminal of an actuator 32 (which is designated the positive terminal). One of station wires 42 is designated station wire 42a and shown in dashes for reasons described below. Also, the actuator 32 to which station wire 42a is connected is designated actuator 32a.

BRIEF SUMMARY

The present invention extends to a chemigation system that can be easily integrated into existing irrigation systems. The chemigation system can include a primary controller that can be installed near the irrigation controller of the irrigation system. The chemigation system can also include a secondary controller that can be installed near a valve assembly of the irrigation system. The primary controller and secondary controller can leverage the existing irrigation wire of the irrigation system to intercommunicate for purposes of controlling the injection of chemicals into the irrigation water and controlling an actuator for a valve of the valve assembly.

In some embodiments, the present invention may be implemented as a chemigation system for use with an irrigation system that includes an irrigation controller and a valve assembly having one or more valves for controlling flow of water from a main line to corresponding one or more station lines. The chemigation system may include a primary controller having a voltage monitor for monitoring voltage on at least one station terminal of the irrigation controller, a processor for generating relay control signals based on the monitored voltage, and a first powerline modem that is configured to transmit the relay control signals to a secondary controller via a station wire of a sprinkler wire that extends between the irrigation controller and the valve assembly. The chemigation system may also include a secondary controller having a second powerline modem that is configured to receive the relay control signals from the first powerline modem via the station wire and a processor for generating driving voltages for driving one or more relays of the secondary controller based on the relay control signals.

In some embodiments, the present invention may be implemented as a method for configuring an irrigation system to perform chemigation. The irrigation system may include an irrigation controller, a valve assembly having one or more valves for controlling flow of water from a main line to corresponding one or more station lines, and a sprinkler wire that connects the irrigation controller to the one or more valves. A first station wire of the sprinkler wire can be identified where the first station wire is connected between a first station terminal of the irrigation controller and an actuator of a first valve of the one or more valves. The first station wire can then be connected between a power terminal of a primary controller of a chemigation system and a power terminal of a secondary controller of the chemigation system. A voltage monitor of the primary controller can also be connected to the first station terminal. A station relay of the secondary controller can be connected to the actuator of the first valve.

In some embodiments, the present invention may be implemented by a chemigation system as a method for performing chemigation. A primary controller can detect a voltage on a station terminal of an irrigation controller. In response to detecting the voltage, the primary controller can generate a station relay control signal and a tank relay control signal. The primary controller can transmit the station relay control signal and the tank relay control signal to a secondary controller. In response to the station relay control signal, the secondary controller can cause an actuator corresponding to the station terminal to be driven to thereby open a valve connecting a main line to a station line. In response to the tank relay control signal, the secondary controller can cause an actuator corresponding to a tank valve to be driven to thereby open a tank valve for injecting a chemical from a tank into the main line.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
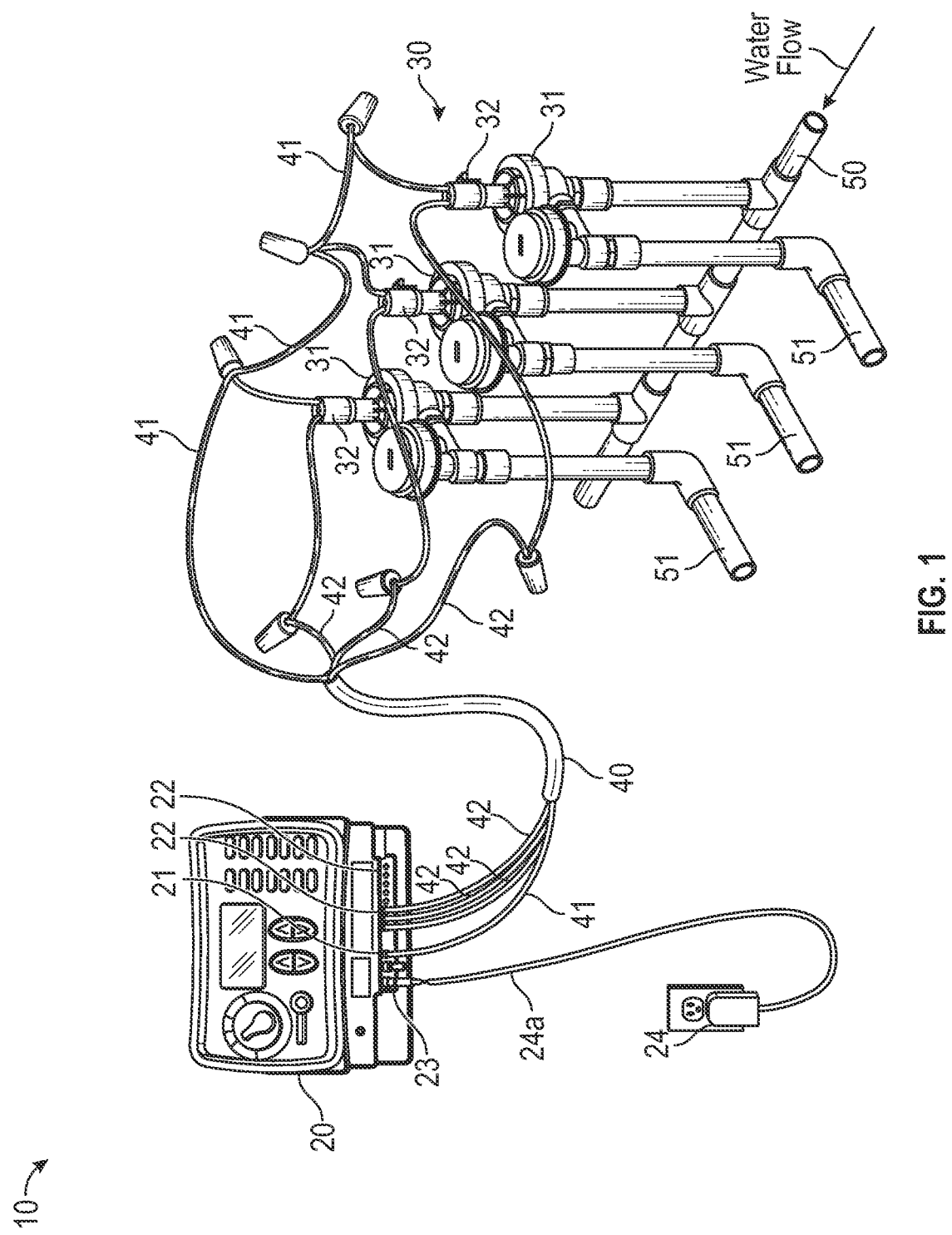
FIG. 1 illustrates a prior art irrigation system that is commonly used for residential and commercial landscapes.
Figure 2:
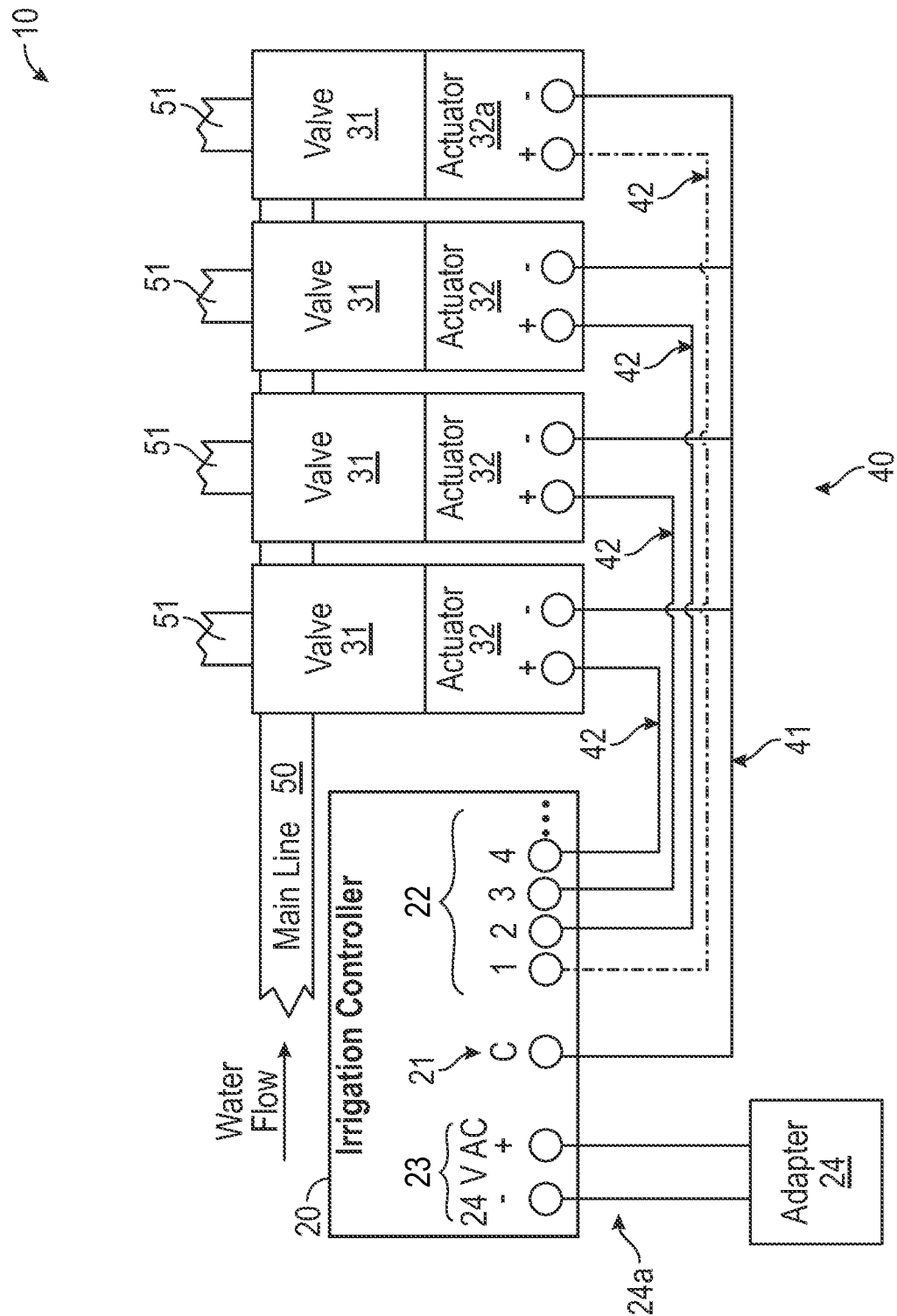
FIG. 2 is a block diagram of the irrigation system of FIG. 1.
Figure 3:
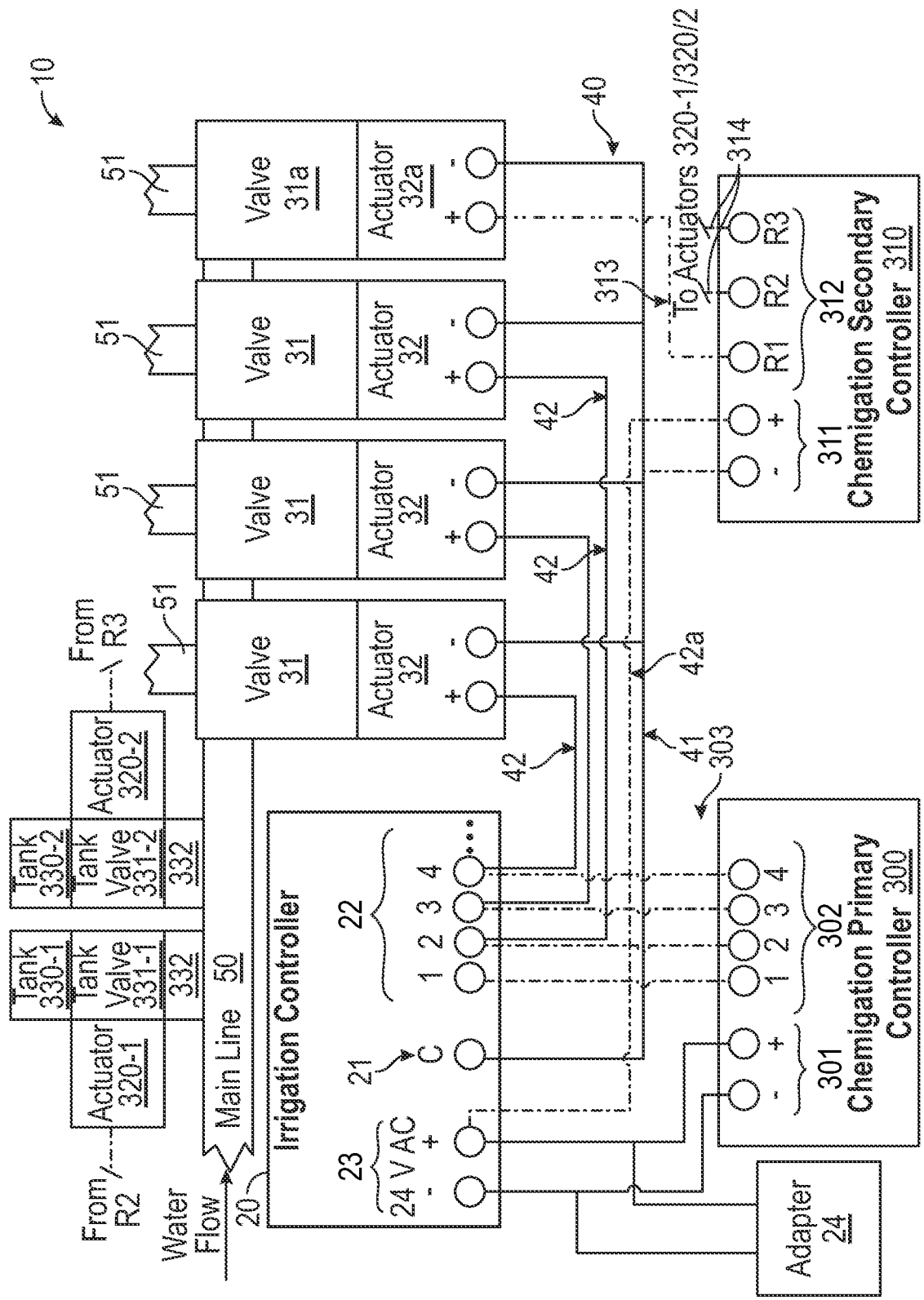
FIG. 3 is an example of how a chemigation system configured in accordance with one or more embodiments of the present invention can be integrated into the irrigation system of FIGS. 1 and 2.

FIG. 3, which is based on FIG. 2, provides an example of how a chemigation system configured in accordance with one or more embodiments of the present invention can be integrated into irrigation system 10. It is noted, however, that a chemigation system could be integrated into any irrigation system that includes an irrigation controller that is connected to valve actuators via irrigation wire.

In addition to the components shown in FIG. 2, FIG. 3 includes a chemigation primary controller 300 (or primary controller 300) and a chemigation secondary controller 310 (or secondary controller 310). Primary controller 300 may typically be installed adjacent to irrigation controller 20 (e.g., by mounting primary controller 300 to the wall next to irrigation controller 20), and secondary controller 310 may typically be installed adjacent to valve assembly 30 (e.g., in the same valve box or in a separate box adjacent to the valve box). Preferably, secondary controller 310 can be positioned close enough to actuators 32 to enable station wire 42a to be disconnected from actuator 32a and connected to secondary controller 310. However, additional wire could be spliced to station wire 42a if necessary. In the depicted example, station wire 42a is the station wire for station 1, but any other station wire 42 could be used as station wire 42a. Also, in some embodiments, more than one station wire 42 could be used as station wire 42a.

Primary controller 300 includes power terminals 301 which can be connected to power terminals 23 of irrigation controller 20. As described below, in some embodiments, primary controller 300 can include an AC/DC converter to convert the 24 V AC power to 5 V DC power for powering a processor (e.g., Raspberry Pi) or other suitable circuitry for performing the functionality described herein. Primary controller 300 can also include station monitoring terminals 302 that can be connected to station terminals 22 via station sensing wires 303.

In comparison to FIG. 2, in FIG. 3, one end of station wire 42a has been disconnected from the station terminal 22 for station 1 and connected to the positive terminal of power terminals 23, and the other end of station wire 42a has been disconnected from actuator 32a and connected to the positive terminal of power terminals 311 on secondary controller 310. The negative terminal of power terminals 311 can be connected to common terminal 21 (e.g., by connecting it to common wire 41). As described in detail below, in addition to powering secondary controller 310, station wire 42a can be used to provide data/control signals to secondary controller 310 to control the injection of chemicals into main line 50 and to control actuator 32a.

Secondary controller 310 can include a number of relays 312 such as a station relay R1 that is connected to the positive terminal of actuator 32a via a station relay wire 313. Secondary controller 310 can also include one or more tank relays 312, such as tank relay R2 and tank relay R3, for controlling the injection of chemicals into main line 50. For example, one tank 330-1 could contain fertilizer and another tank 330-2 (generally tank(s) 330) could include pesticide, both of which could be connected to main line 50 via a tank valve 331-1/331-2 (generally tank valve(s) 331) and a coupler 332. In some embodiments, coupler 332 could include or form a venturi tube. Actuator 320-1 and 320-2 could be coupled to tank valves 331-1 and 331-2 and could be connected to tank relays 312 via tank relay wires 314.

Figure 4:
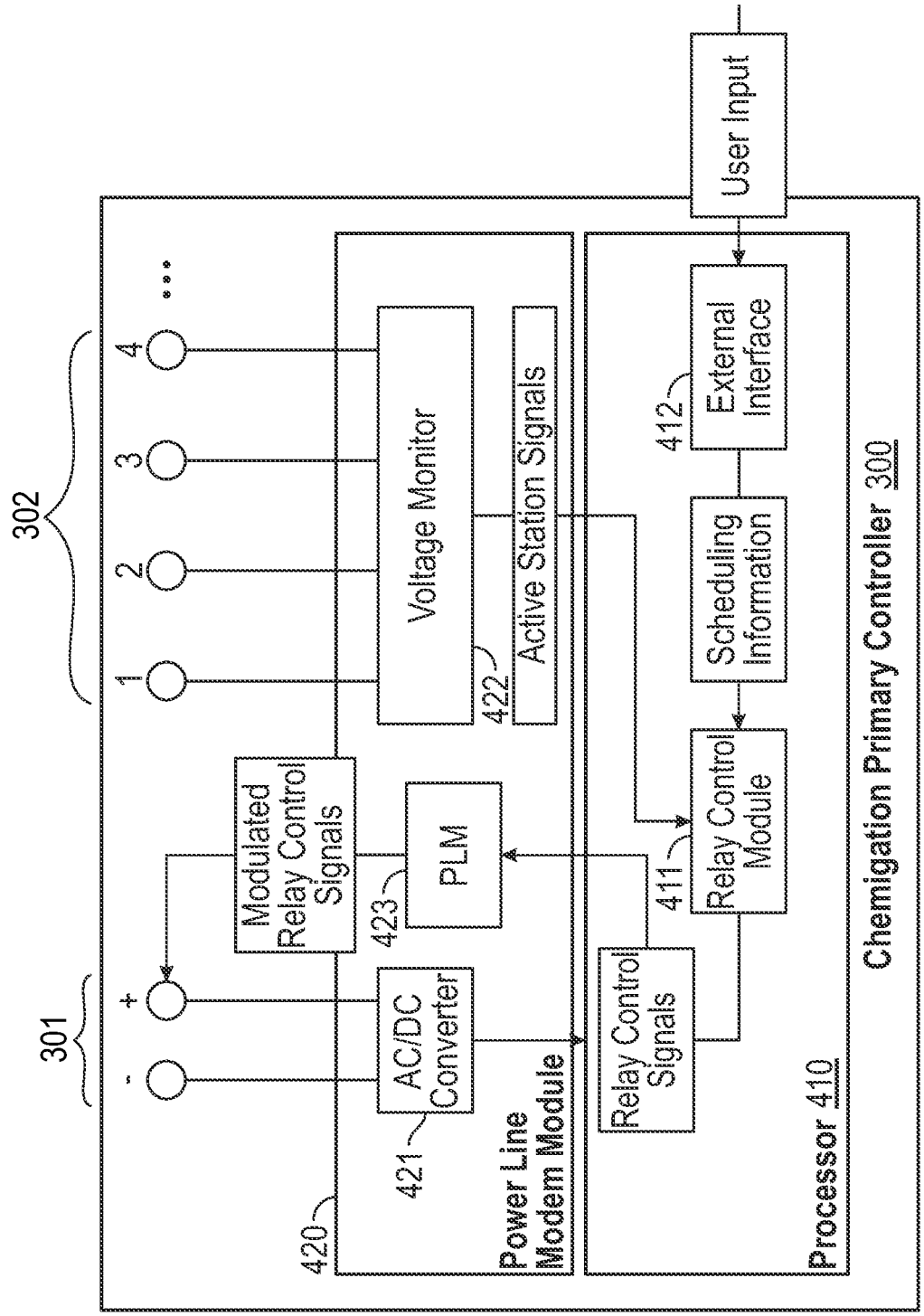
FIG. 4 is an example of how a primary controller of the chemigation system can be configured.

FIG. 4 provides a more detailed example of how primary controller 300 could be configured in one or more embodiments of the present invention. Primary controller 300 could include a processor 410 and a powerline modem (PLM) 420. Processor 410 can be any circuitry capable of performing the functionality described herein such as the Raspberry Pi processor. Powerline modem 420 can also be any circuitry capable of performing the functionality described herein.

Among possibly other components, powerline module 420 can include an AC/DC converter 421 for converting the 24 V AC power of irrigation controller 20 to 5 V DC power for processor 410. However, in some embodiments, a separate power supply could be used to power processor 410 and/or powerline modem 420 or processor 410 could be configured to run on 24 V AC (or any other suitable voltage). Powerline modem 420 can also include a voltage monitor 422 that has inputs coupled to each station monitoring terminal 302 and an output that is coupled to processor 410 for providing active station signals to processor 410. For example, voltage monitor 422 can detect when a voltage is present on a particular station monitoring terminal 302 and can provide an active station signal identifying the particular station monitoring terminal 302 (e.g., to identify whether irrigation controller 20 is attempting to run station 1, 2, 3, or 4). In some embodiments, voltage monitor 422 can be used to supply the 24 V AC power to one of station monitoring terminals 302 to open the corresponding actuator 32a. For example, primary controller 300 can cause stations 2-4 to be watered independent of irrigation controller 20 by using voltage monitor 422 to apply the 24 V AC power to the corresponding station monitoring terminals 302.

Among possibly other components, processor 410 can include a relay control module 411 that receives the active station signals from voltage monitor 422. Processor 410 can also include an external interface 412 by which user input can be received for controlling the chemigation process. External interface 412 could represent a locally presented user interface (e.g., buttons and/or a touch screen on primary controller 300), a remotely accessible interface (e.g., a Wi-Fi or Bluetooth interface that enables a user to control the chemigation process via a browser or a mobile application), or any other suitable interface. The user input provided via external interface 412 could include any information for configuring primary controller 300 and any information for controlling the chemigation process such as a timing for injecting one or more chemicals into main line 50, an identification of which stations should receive the chemical(s), an amount of the chemical(s) to inject, etc. ("scheduling information"). Such scheduling information can be provided to relay control module 411 to enable relay control module 411 to generate relay control signals in accordance with the active station signals it receives from voltage monitor 422.

Relay control module 411 can output relay control signals defining which relays 312 should be driven based on the active station signals and the scheduling information. Powerline modem 420 can modulate these relay control signals on the 24 V AC signal for delivery to secondary controller 310 via station wire 42a.

Figure 5:
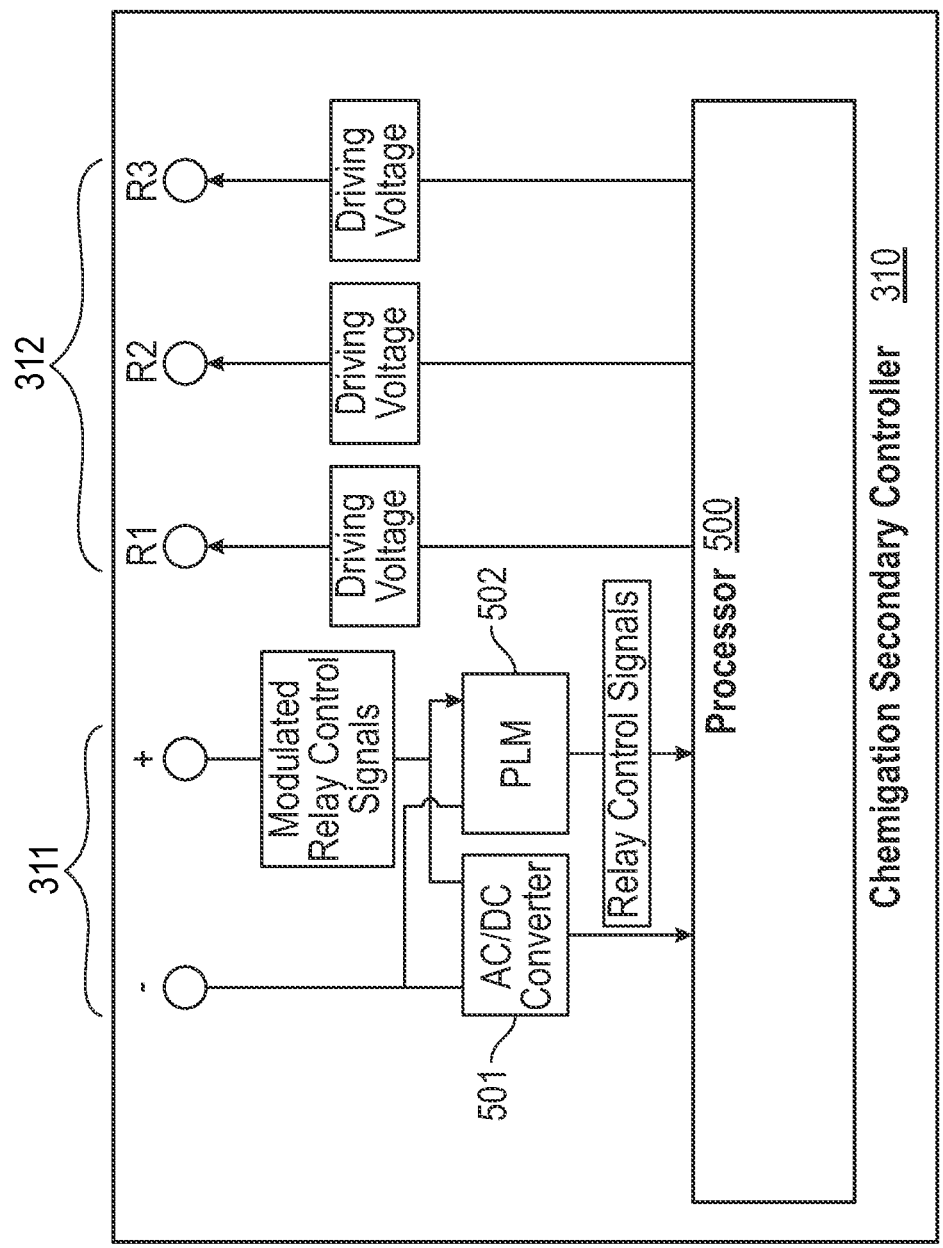
FIG. 5 is an example of how a secondary controller of a chemigation system can be configured.

FIG. 5 provides a more detailed example of how secondary controller 310 may be configured in one or more embodiments of the present invention. Secondary controller 310 could include a processor 500, an AC/DC converter 501 and a powerline modem 502. Processor 500 can be any circuitry capable of performing the functionality described herein such as an ATmega328 microcontroller. AC/DC converter 501 can be configured to convert the 24 V AC power to 5 V DC power (or whatever power processor 500 requires). Powerline modem 502 can be configured to extract the modulated relay control signals from the 24 V AC power on station wire 42a.

Processor 500 can be configured to receive the relay control signals from powerline modem 502 and to generate and output appropriate driving voltage(s) for controlling relays 312. For example, if a relay control signal indicates that station 1 should be on, processor 500 can output a driving voltage to station relay R1 to thereby cause actuator 32a to open the corresponding valve 31. Similarly, if a relay control signal indicates that a chemical should be injected from tank 330-1, processor 500 could output a driving voltage to tank relay R2 to thereby cause actuator 320-1 to open tank valve 331-1.

Figure 6:
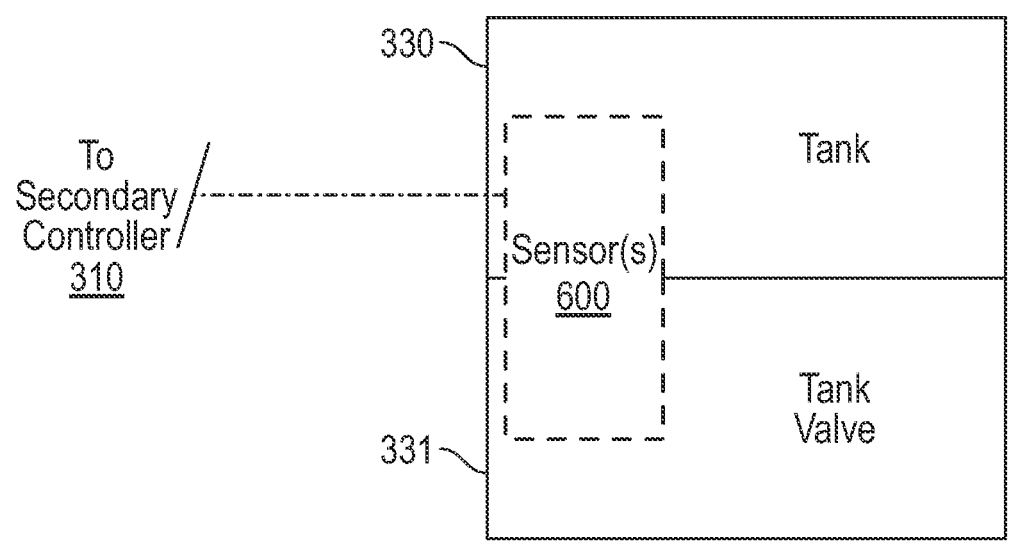
FIG. 6 provides an example of how a chemigation system can leverage one or more sensors.

In some embodiments, one or more sensors may be employed at tanks 330 to monitor and report information about the injection of chemicals. For example, FIG. 6 shows that one or more sensors 600 could be included in or at tank 330 and/or tank valve 331 to monitor a fluid level within tank 330, a flow rate of fluid out from tank 330, etc. Sensor(s) 600 could provide such information to processor 510 which in turn could employ powerline modem 502 to transmit the information to processor 410. Processor 410 could then employ external interface 412 to present the information to a user or otherwise transmit it for storage and/or review. For example, processor 410 could use the information reported by sensors 600 to inform the user (e.g., via a mobile application or other user interface) of an amount of chemical that has been injected and the time of such injection on each station. By providing such information, processor 410 can assist the user in making informed decisions for controlling subsequent chemigations.

Figure 7A:
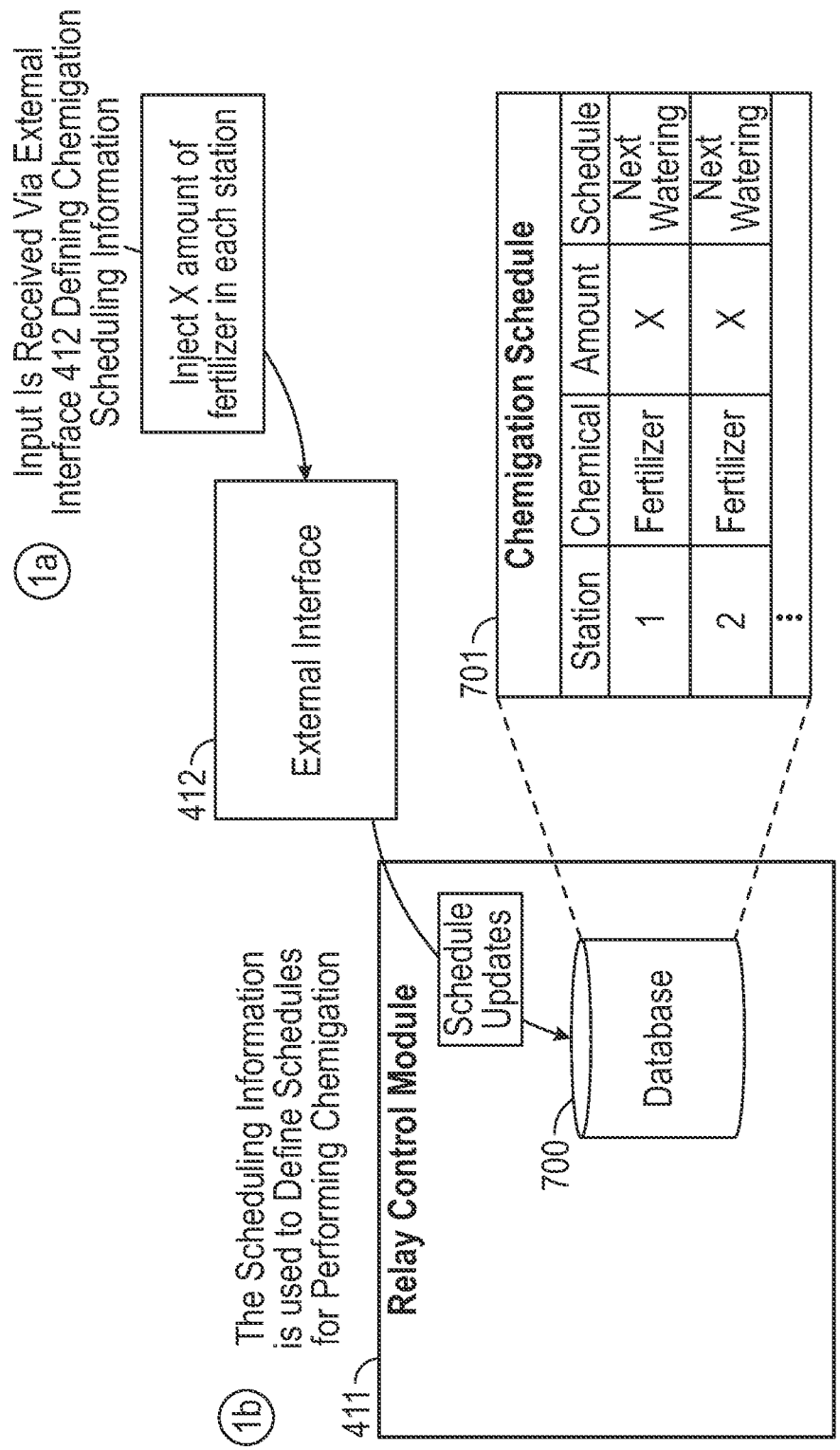
FIGS. 7A-7F provide an example of how the chemigation system can perform chemigation in one or more embodiments of the present invention.

FIGS. 7A-7F provide an example, based on FIGS. 3-5, of how a chemigation system configured in accordance with one or more embodiments of the present invention may function. Turning to FIG. 7A, it is assumed, in step 1a, that input is received via external interface 412 and the input defines chemigation scheduling information. To simplify this example, the input is assumed to indicate that an amount X of fertilizer should be injected in each station. Notably, a user could provide this input based on information provided by sensor(s) 600. It is also assumed that fertilizer is stored in tank 330-1. In step 1b, the scheduling information from the input is used to define schedules for performing chemigation. For example, relay control module 411 may include or employ a database 700 in which a chemigation schedule 701 is maintained. As an example only, chemigation schedule 701 includes entries identifying a station, a chemical that should be injected in the station, an amount of the chemical to inject, and a schedule for injecting the chemical. Steps 1a and 1b could be performed repeatedly at any time to define, update, or cancel chemigation on any station. Alternatively, in some embodiments, a user could manually trigger chemigation rather than providing user input to schedule it (e.g., by specifying that chemigation should be performed on a particular station at a particular time regardless of whether irrigation controller 20 is scheduled to run that station at that particular time).

Figure 7B:
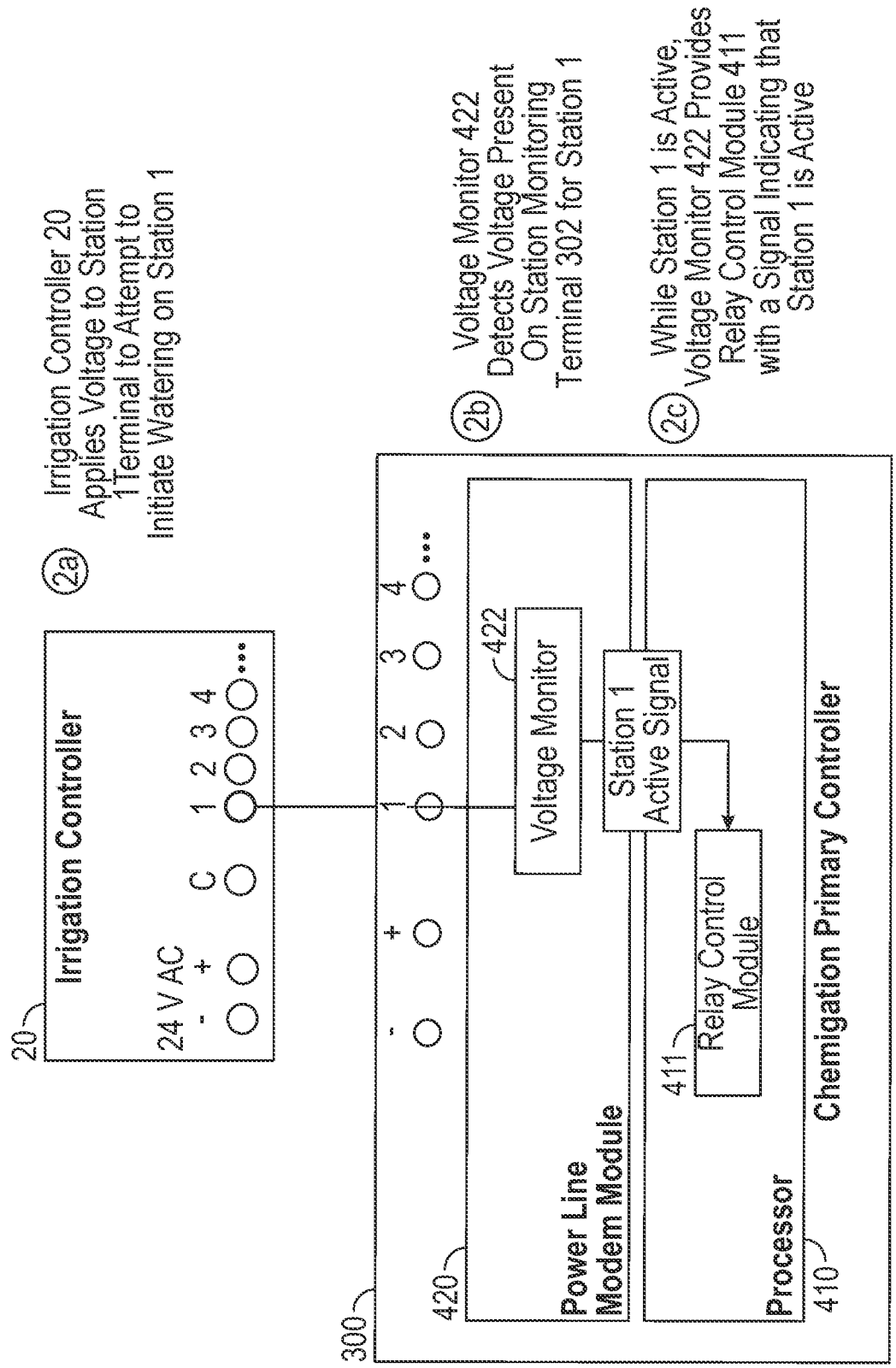

Turning to FIG. 7B, in step 2a, it is assumed that irrigation controller 20 applies voltage to the station 1 terminal to attempt to initiate watering on station 1. Irrigation controller 20 may do so in accordance with any defined irrigation schedule, in response to manual input, etc. Notably, because station wire 43a is not connected between the station 1 terminal and actuator 32a, actuator 32a will not yet open valve 31. Alternatively, processor 410 could determine that station 1 should be watered independent of irrigation controller 20.

In step 2b, voltage monitor 422 will detect, via sensing wire 303, that voltage (e.g., 24 V AC) is present on the station 1 terminal. In response, in step 2c, voltage monitor 422 can output to relay control module 411 a signal indicating that station 1 is active. In some embodiments, voltage monitor 422 may provide this station 1 active signal as long as a voltage is detected on the station 1 terminal. Notably, voltage monitor 422 could performs steps 2b and 2c whenever a voltage is detected on any of the other station terminals 22. Accordingly, the signals that voltage monitor 422 provides can indicate which station terminal 22 is active. Also, in some embodiments, voltage monitor 422 can be configured to supply the voltage to the station terminals 22 for stations 2-4 (e.g., in response to input from relay control module 411 or another component of processor 410) to thereby cause these stations to be watered independent of irrigation controller 20.

Figure 7C:
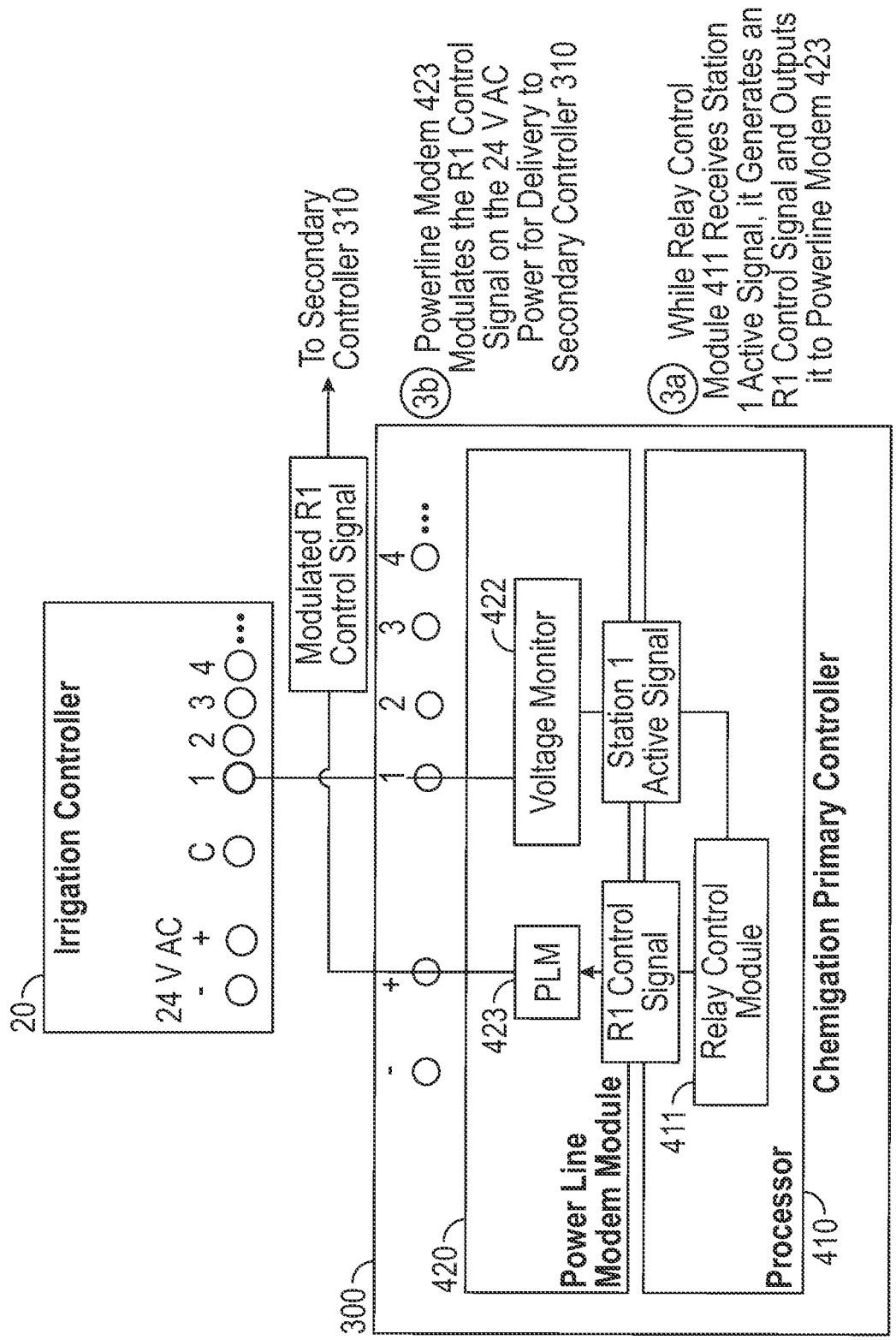

FIG. 7C represents functionality that can be performed whenever station 1 is active (or whenever the station(s) from which station wire 42a has been disconnected is active). In other words, FIG. 7C can represent how the chemigation system ensures that station 1 will be irrigated in accordance with irrigation controller 20's schedule even though station wire 42a has been repurposed. In step 3a, relay control module 411 can detect the station 1 active signal and, in response, can generate an R1 control signal. This R1 control signal can be any control signal that indicates that station relay R1 should be driven. In some embodiments, relay control module 411 could output the R1 control signal as long as the station 1 active signal is received (or as long as it determines that station 1 should be watered independent of irrigation controller 20). In other embodiments, relay control module 411 could generate a single R1 control signal indicating that station relay R1 should be driven and could subsequently generate a single R1 control signal indicating that station relay R1 should no longer be driven. In step 3b, powerline modem 423 can modulate the R1 control signal on the 24 V AC power for delivery to secondary controller 310 via station wire 42a.

Figure 7D:
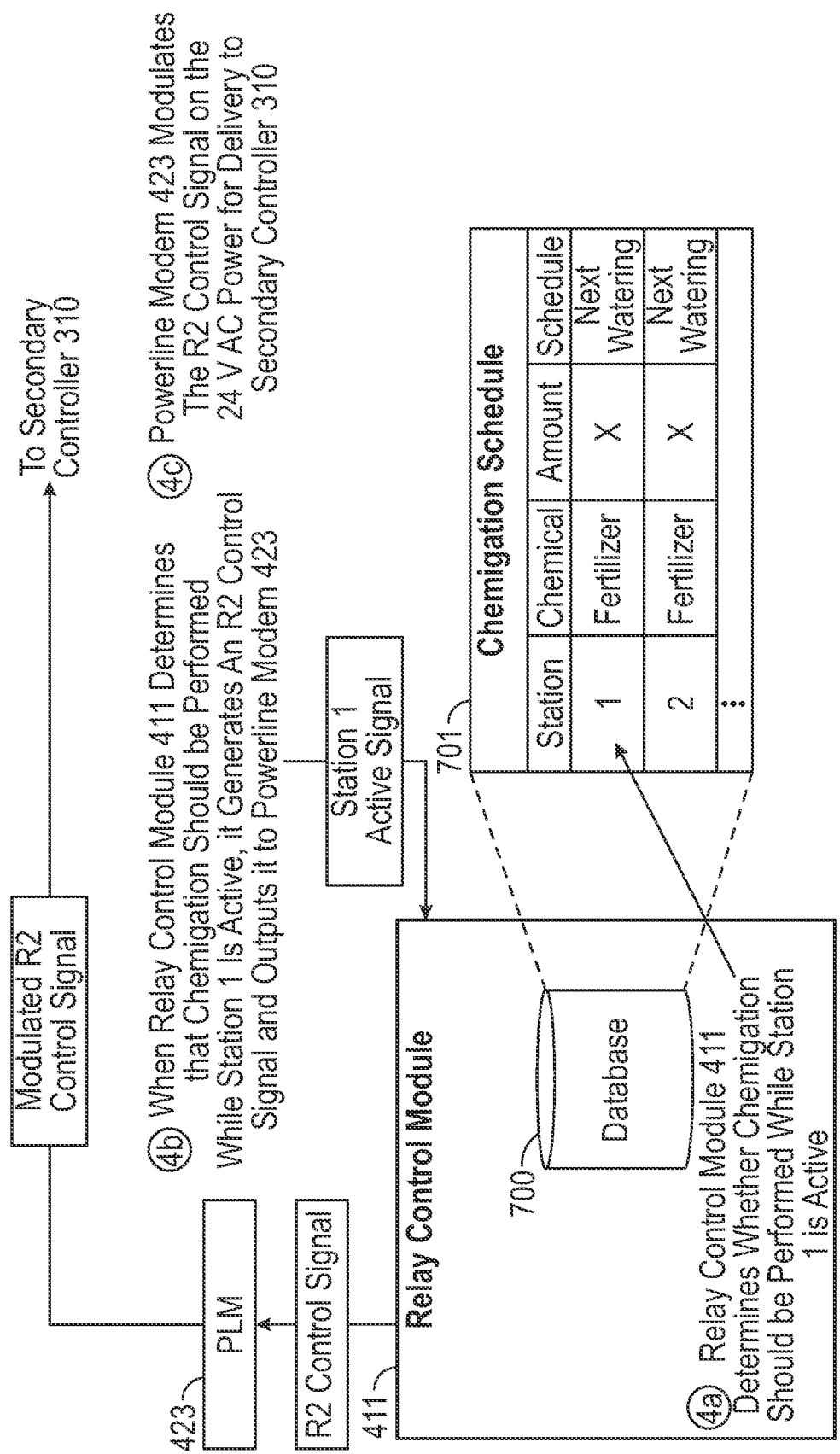

Although it uses station 1 as an example, FIG. 7D represents functionality that can be performed whenever any station is active to determine whether chemigation should be performed and to control the chemigation. Although this functionality is represented as being separate from the functionality of FIG. 7C, the functionality of FIG. 7D could be performed at the same time as the functionality of FIG. 7C when station 1 is the active station.

In step 4a and in conjunction with receiving the station 1 active signal (or an active signal for any other station), relay control module 411 can determine whether chemigation should be performed while station 1 is active. For example, relay control module 411 could access chemigation schedule 701 and determine that it includes an entry defining that X amount of fertilizer should be injected in station 1 during the next watering. Alternatively, in step 4a, relay control model 411 (or another component of processor 410) could determine that chemigation should be performed on a station even though irrigation controller 20 is not driving that station and could therefore provide the voltage for driving that station (e.g., via the R1 control signal for station 1 or via voltage monitor 422 for stations 2-4). In step 4b, and in response to determining that chemigation should be performed on station 1 while it is active, relay control module 411 can generate an appropriate relay control signal. In this example and based on the assumption that fertilizer is stored in tank 330-1, relay control module 411 can generate an R2 control signal and provide it to powerline modem 423. In step 4c, powerline modem 423 can modulate the R2 control signal on the 24 V AC power for delivery to secondary controller 310 via station wire 42a.

Figure 7E:
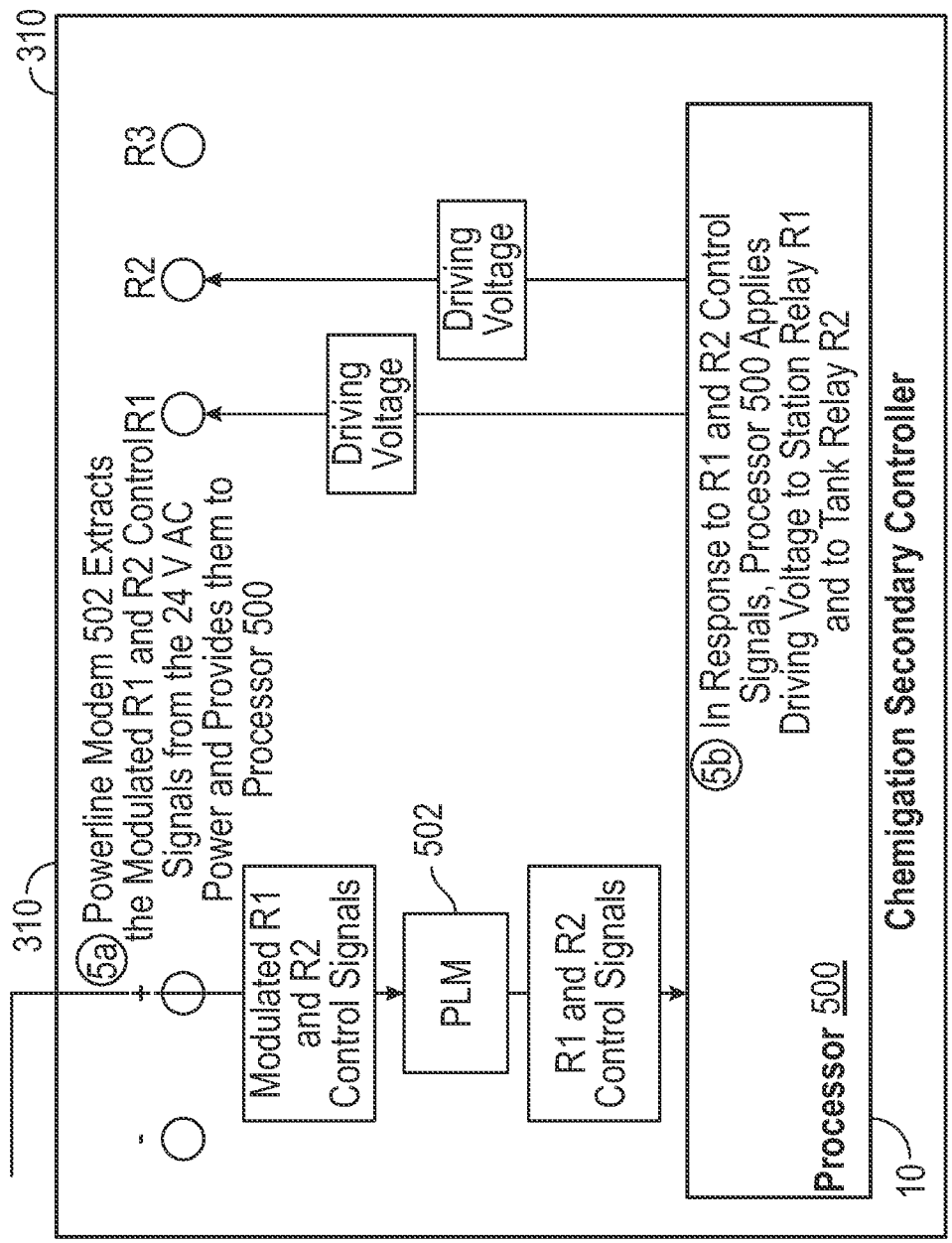

Turning to FIG. 7E, in step 5a, powerline modem 502 extracts the modulated R1 and R2 control signals (which may be, but need not be, received at the same time) and then provides the R1 and R2 control signals to processor 500 (which again need not occur at the same time). In step 5b and in response to receiving the R1 and R2 control signals, processor 500 can generate and output driving voltages to station relay R1 and tank relay R2.

Figure 7F:
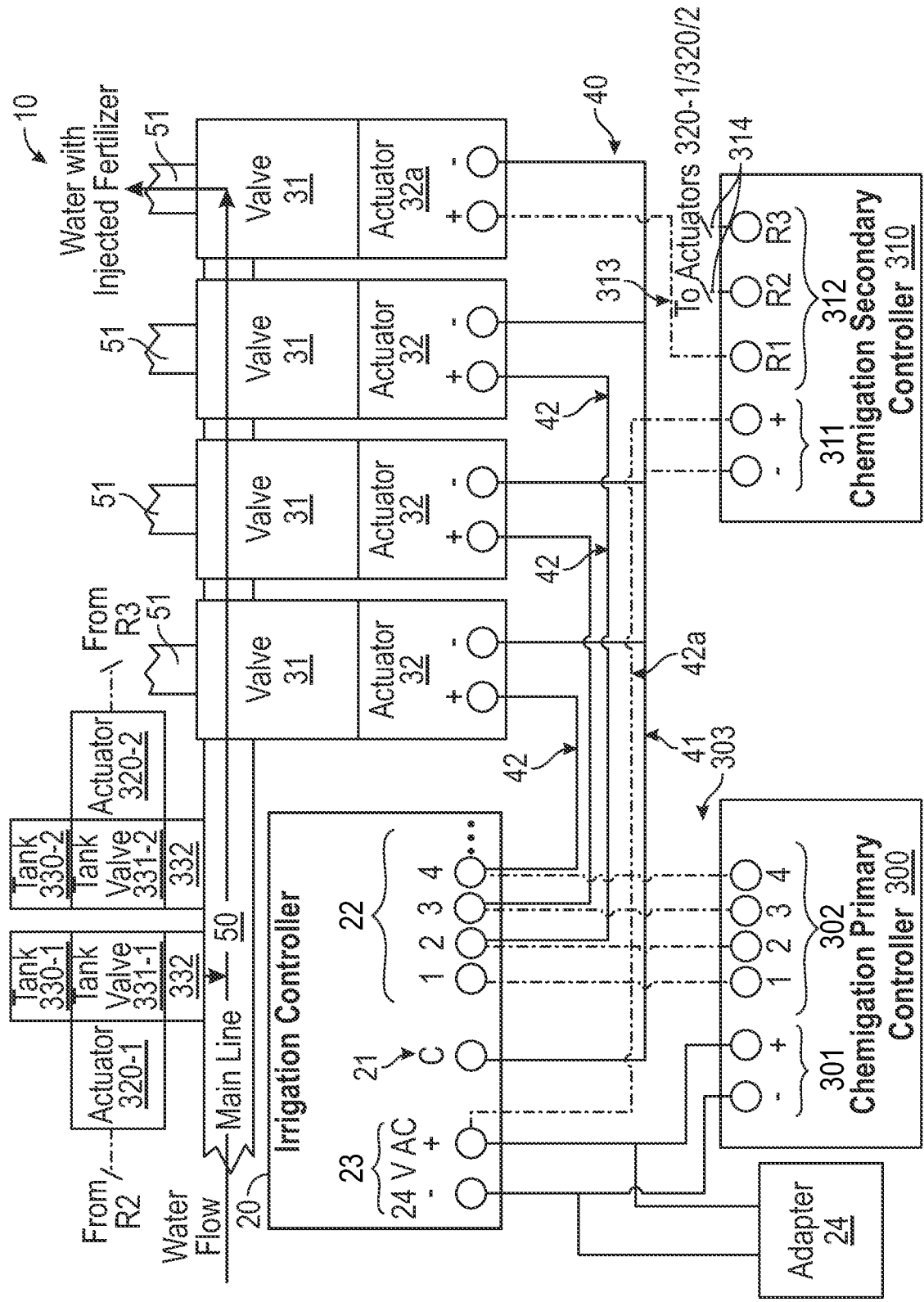

Turning to FIG. 7F, by applying the driving voltage to station relay R1 (e.g., to close a switch or otherwise cause voltage to be applied to station relay wire 313), actuator 32a will open valve 31 thereby allowing water from main line 50 to flow into the station line 51 for station 1. Also, by applying the driving voltage to tank relay R2 (e.g., to close a switch or otherwise cause voltage to be applied to tank relay wire 314), actuator 320-1 will open tank valve 331-1 so that fertilizer in tank 330-1 will be injected into main line 50 while station 1 is irrigated.

Returning to FIG. 7E, processor 500 can apply the driving voltage to station relay R1 as long as voltage monitor 422 detects a voltage on the station 1 terminal, or in other words, as long as irrigation controller 20 is attempting to irrigate station 1. As mentioned above, various techniques could be employed to accomplish this. For example, relay control module 411 could continuously provide the R1 control signal as long as it is receiving the station 1 active signal (i.e., processor 500 can generate the driving voltage until the R1 control signal is no longer detected). As another example, relay control module 411 could send a "start R1 control signal" to cause processor 500 to start generating the driving voltage and a "stop R1 control signal" to cause processor 500 to stop generating the driving voltage.

Similar techniques could be used to cause processor 500 to provide a driving voltage to the tank relays while also accounting for the schedule. For example, relay control module 411 could determine that chemigation should be stopped even though a station remains active such as may be the case when the specified amount of chemical has been applied before the station's irrigation time has been completed or manual input is received to stop chemigation.

In summary, a chemigation system configured in accordance with embodiments of the present invention can be easily integrated into existing irrigation systems without disturbing landscaping or structures. A chemigation system configured in accordance with embodiments of the present invention could equally be installed at the same time as an irrigation system with minimal additional components or wiring. As a result, many more homeowners and commercial landowners can employ chemigation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A chemigation system for integration into an existing irrigation system that includes an irrigation controller, a valve assembly having one or more valves for controlling flow of water from a main line to corresponding one or more station lines and a sprinkler wire that extends between the irrigation controller and the valve assembly, the chemigation system being configured to add chemigation functionality to the existing irrigation system, the chemigation system comprising:

a primary controller that is configured to be positioned near the irrigation controller, the primary controller having:

a voltage monitor that is configured to be electrically coupled to each of at least one station terminal of the irrigation controller to enable the voltage monitor to monitor voltage on each of the at least one station terminal of the irrigation controller, the voltage on each of the at least one station terminal being output to control a corresponding valve of the one or more valves in the valve assembly, a processor for generating relay control signals based on the voltage monitored on each of the at least one station terminal, and a first powerline modem that is configured to transmit the relay control signals to a secondary controller via a station wire of the sprinkler wire that extends between the irrigation controller and the valve assembly; and a secondary controller that is configured to be positioned near the valve assembly of the existing irrigation system, the secondary controller having:

a second powerline modem that is configured to receive the relay control signals from the first powerline modem via the station wire, and a processor for generating driving voltages for driving one or more relays of the secondary controller based on the relay control signals.

2. The chemigation system of claim 1, wherein the one or more relays include a station relay that is configured to be connected to a first actuator for a first valve of the one or more valves.

3. The chemigation system of claim 2, wherein the relay control signals include a station relay control signal that the processor of the primary controller generates when the voltage monitor detects a voltage on a station terminal corresponding to the first valve.

4. The chemigation system of claim 1, wherein the one or more relays include one or more tank relays that are each configured to be connected to an actuator for a tank valve that controls injection of a chemical into the main line.

5. The chemigation system of claim 4, wherein the one or more tank relays include a first tank relay that is configured to be connected to an actuator for a tank valve that controls injection of a fertilizer into the main line.

6. The chemigation system of claim 4, wherein the one or more tank relays include a first tank relay that is configured to be connected to an actuator for a tank valve that controls injection of a pesticide into the main line.

7. The chemigation system of claim 4, wherein the relay control signals include a tank relay control signal that the processor of the primary controller generates to cause a chemical to be injected into the main line.

8. The chemigation system of claim 7, wherein the relay control signals also include a station relay control signal that the processor of the primary controller generates when the voltage monitor detects a voltage on a station terminal, and wherein the processor of the primary controller generates the tank relay control signal in conjunction with generating the station relay control signal.

9. The chemigation system of claim 1, wherein the primary controller includes an external interface by which input is received for defining when the relay control signals are generated.

10. The chemigation system of claim 9, wherein the input defines a schedule for injecting one or more chemicals.

11. The chemigation system of claim 1, further comprising:

one or more sensors that generate information defining an amount of chemicals that have been injected.

12. A method for configuring an existing irrigation system to perform chemigation, the existing irrigation system including an irrigation controller, a valve assembly having one or more valves for controlling flow of water from a main line to corresponding one or more station lines, and a sprinkler wire that extends between the irrigation controller and the valve assembly, the method comprising:

positioning a primary controller of a chemigation system near the irrigation controller and a secondary controller of the chemigation system near the valve assembly;

identifying a first station wire of the sprinkler wire, the first station wire being connected between a first station terminal of the irrigation controller and an actuator of a first valve of the one or more valves;

connecting the first station wire between a power terminal of the primary controller of the chemigation system and a power terminal of the secondary controller of the chemigation system;

connecting a voltage monitor of the primary controller to the first station terminal; and connecting a station relay of the secondary controller to the actuator of the first valve.

13. The method of claim 12, further comprising:
connecting the voltage monitor of the primary controller to one or more additional station terminals of the irrigation controller.

14. The method of claim 12, further comprising:
connecting one or more tank relays of the secondary controller to one or more actuators for one or more tanks valves that control injection of a chemical into the main line.

15. A method, implemented by a chemigation system, for performing chemigation via an existing irrigation system that includes an irrigation controller, a valve assembly having one or more valves for controlling flow of water from a main line to corresponding one or more station lines and a sprinkler wire that extends between the irrigation controller and the valve assembly, the chemigation system being configured to add chemigation functionality to the existing irrigation system, the method comprising:

detecting, at a primary controller of the chemigation system which is positioned near the irrigation controller of the existing irrigation system, a voltage on a station terminal of the irrigation controller;

in response to detecting the voltage, generating, by the primary controller, a station relay control signal and a tank relay control signal;

transmitting, by the primary controller and via a station wire of the sprinkler wire that extends between the irrigation control and the valve assembly, the station relay control signal and the tank relay control signal to a secondary controller of the chemigation system which is positioned near the valve assembly of the existing irrigation system;

in response to the station relay control signal, causing, by the secondary controller, an actuator corresponding to the station terminal to be driven to thereby open a valve connecting a main line to a station line; and in response to the tank relay control signal, causing, by the secondary controller, an actuator corresponding to a tank valve to be driven to thereby open a tank valve for injecting a chemical from a tank into the main line.

16. The method of claim 15, wherein the station relay control signal and the tank relay control signal are transmitted via a powerline modem.

17. The method of claim 15, wherein the tank control signal is generated based on scheduling information.

18. The method of claim 15, further comprising:
ceasing to detect the voltage on the station terminal of the irrigation controller; and in response, ceasing to cause the actuator corresponding to the station terminal to be driven and ceasing to cause the actuator corresponding to the tank valve to be driven.

19. The method of claim 15, further comprising:
detecting, at the primary controller, a voltage on a second station terminal of the irrigation controller;

in response to detecting the voltage on the second station terminal, generating, by the primary controller, the tank relay control signal while foregoing generating the station relay control signal;

transmitting, by the primary controller, the tank relay control signal to the secondary controller; and in response to the tank relay control signal, causing, by the secondary controller, the actuator corresponding to the tank valve to be driven to thereby open the tank valve for injecting the chemical from the tank into the main line.

20. The method of claim 15, wherein the tank relay control signal is a first tank relay control signal, the tank valve is a first tank valve, and the tank is a first tank, the method further comprising:

in response to detecting the voltage, generating, by the primary controller, a second tank relay control signal;

transmitting, by the primary controller, the second tank relay control signal to the secondary controller; and in response to the second tank relay control signal, causing, by the secondary controller, an actuator corresponding to a second tank valve to be driven to thereby open a second tank valve for injecting a chemical from a second tank into the main line.

* * * * *